(No Model.) 2 Sheets—Sheet 1.
A. ROSENHOLZ.
CONDUIT ELECTRIC RAILWAY.
No. 534,519. Patented Feb. 19, 1895.
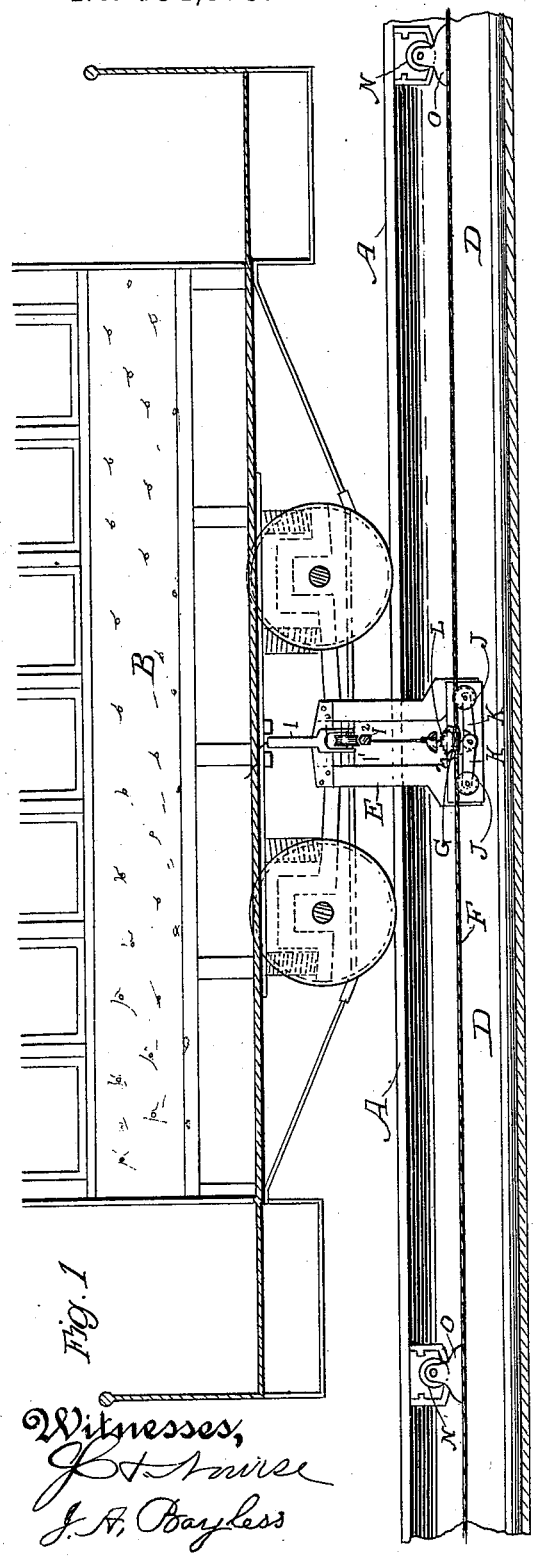
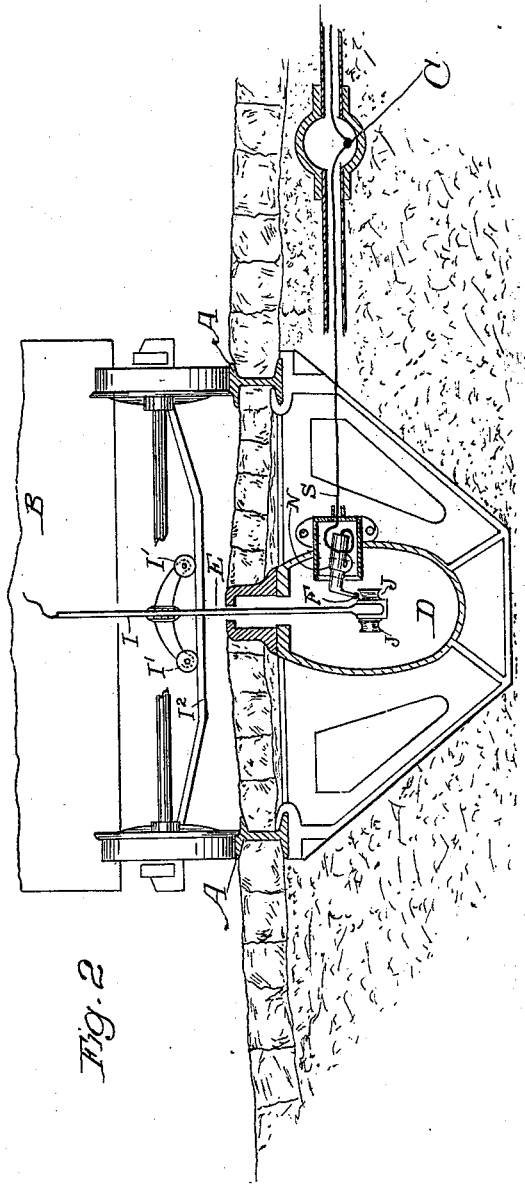

(No Model.) 2 Sheets—Sheet 2.
A. ROSENHOLZ.
CONDUIT ELECTRIC RAILWAY.
No. 534,519. Patented Feb. 19, 1895.
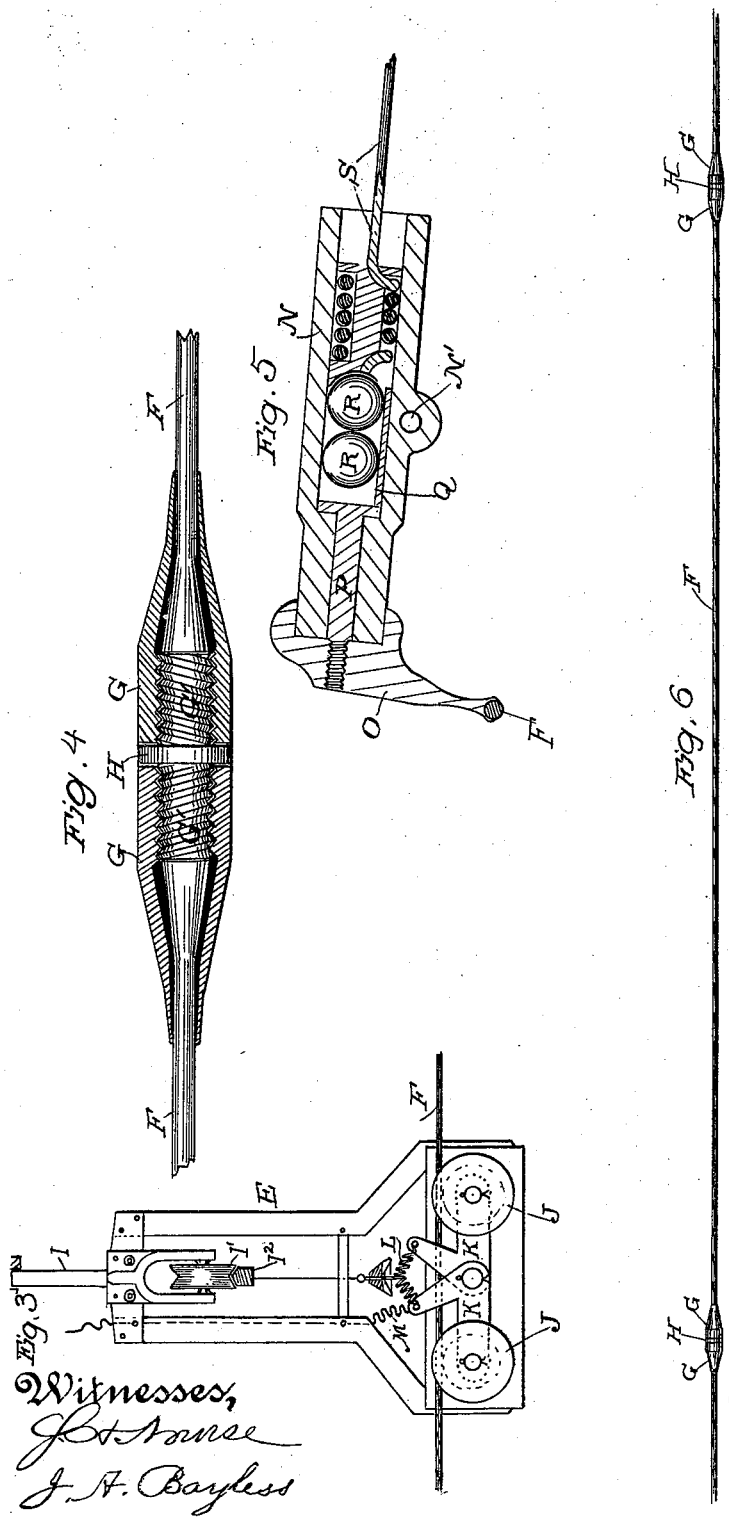

UNITED STATES PATENT OFFICE.

ALFRED ROSENHOLZ, OF SAN FRANCISCO, CALIFORNIA, ASSIGNOR OF ONE-HALF TO SAMUEL J. CLARKE AND HARVEY S. BROWN, OF SAME PLACE.

CONDUIT ELECTRIC RAILWAY.

SPECIFICATION forming part of Letters Patent No. 534,519, dated February 19, 1895.

Application filed May 22, 1894. Serial No. 512,117. (No model.)

*To all whom it may concern:*

Be it known that I, ALFRED ROSENHOLZ, a citizen of the United States, residing in the city and county of San Francisco, State of California, have invented an Improvement in Conduit Electric Railways; and I hereby declare the following to be a full, clear, and exact description of the same.

My invention relates to improvements in conduit electric railways.

It consists in certain details of construction which will be more fully explained by reference to the accompanying drawings, in which—

Figure 1 is a side elevation showing a car and section of conduit. Fig. 2 is a transverse section of conduit and connections. Fig. 3 is a view of the trolley wheel frame and mechanism. Fig. 4 is an enlarged view of one of the couplings. Fig. 5 is an enlarged section of the connecting hanger. Fig. 6 is a view of the cable and couplings.

The object of my invention is to intermittently transmit the current of electricity from a main line conductor or conductors to the cars or motors as they pass along the track, and to successively supply motive power to the car from these connecting devices, the connection with the main line being cut off as soon as the car has passed.

A is the line of track upon which the car B is adapted to travel.

C is the main conductor from the source of energy, this conductor being properly insulated and buried beneath the surface of the ground adjacent to the line of track in any convenient position. If there are two lines of track, it may be placed between these lines of track so as to supply the current to either one. The return current may either pass through a return wire, or be grounded by connection with the rails.

Between the rails of each track is a conduit D of sufficient size to contain the mechanism employed for the purpose of making communication between the main conductor and the cars. This conduit is made with an open slot upon the upper side, and through this slot extends a frame-work E which carries the trolley wheels by which connection is made.

Within the tube I lay a wire F, which is made in sections of any suitable or convenient length. The sections may be about the length of a car, or, if preferred, of greater length, and at each end these sections are joined together by a coupling shown at G. This coupling may be made of any suitable or desired form. In the present case I have shown it in the form of a casing made in two sections, and adapted to screw upon a threaded non-conducting bolt G' when the parts are united together.

The outer ends of the coupling sections are formed with holes made of increasing diameter toward the inner part, and the ends of the wires F are inserted into these holes and upset or enlarged so that they will not draw out.

Between the meeting ends of the two sections G is a non-conducting washer H against which they abut, and this, together with the non-conducting coupling G', prevents any communication between the ends of the conducting wires F. Consequently, each section is cut off from the other adjacent ones.

E is a frame suitably fixed to and dependent from the car and having at the lower ends the trolley wheels J which are journaled upon the ends of bent levers K fulcrumed upon a common center pin as shown. Between the upper ends of these levers K is fixed a spiral spring L, the elasticity of which allows the levers to move about their fulcrum point, and keeps both the wheels J in contact with the wire F along which they move as the car travels. At points where the car passes around a curve, the flexible wire may be replaced by a rigid bar having the proper curvature. The shank or plate I is also supported by rollers I' which travel upon a transverse track or guide $I^2$ upon the car so as to allow the plate to adjust itself to the curvature of the slot, while passing the curve.

From the levers K, or any convenient metallic contact with the wheels J, the wires M lead up to the car where they connect with the switch board and motor in the usual manner of such connections.

Each of the sections F is temporarily connected with the main conducting wire by means of an oscillating switch mechanism which is constructed as follows: N is an exterior case of non-conducting material having an internal chamber. To one end of this case N is fixed a metallic support or hanger O, to the lower end of which the wire F is attached. The spindle or stem P of the support O extends into the chamber within the case N, and forms contact with the metallic plate Q. Upon this plate rest the balls, rollers, or other movable contact pieces or armatures R. The casing N is fulcrumed upon a pivoted pin at N', and when no car is in the vicinity the weight of the wire F is sufficient to tilt the casing, so that the end carrying the arm O will be the lowest, and the contact pieces R will consequently move to the right end of the chamber. In the opposite end of the casing N and communicating with the chamber in which the contact pieces are contained is an electro magnet formed of a core, the inner end of which is curved or shaped so as to form a considerable contact surface with the rollers or balls R when they are at that end of the chamber. This core is surrounded by coils of wire from the branch S which leads into the tube or tunnel from the main conducting wire of the system. The coils around the core serve to energize the latter whenever the current is flowing. When no car is passing, the casing N will be tilted by its own weight, and the weight of the wire F suspended from it, so that the balls R R will roll down to the lowest end of the chamber in which they are contained. Whenever a car approaches, its wheels passing beneath the wire F within the tube or tunnel, will raise it and the supporting arm O upward, and thus tilt the casing N so that the balls or rollers O move down into contact with the core. As these balls lie upon the metallic plate Q, as soon as this contact is made, a current will flow through the arm O, the wire F, and thence through the trolleys J and the wire M into the motor mechanism of the car, returning thence through a second wire similarly connected with the car, or, if preferred, by grounding the current through the wheels of the car and the track rails upon which they travel which is the method as illustrated in the present case. It will be seen that whenever a car is thus connected with either section of the wire F it will receive a current of electricity as long as its trolley wheels are moving over that section of the wire, and only that section of the wire will be energized by the current from the main conducting wire. Thus the opportunity of loss from leakage through long conducting wires is avoided. As soon as the car passes from this section to the next that will, in turn, receive the current of electricity by reason of the duration of its connections as previously described, and will, in turn, supply the motor upon the car while the latter is within that section. In this manner the car will continue to travel from one end of the line to the other, but no portion of the wire within the tube or tunnel will be energized except while the car is passing it.

Having thus described my invention, what I claim as new, and desire to secure by Letters Patent, is—

1. A conduit electric railway having the slotted tube or tunnel, a main insulated conducting wire extending from the source of power parallel with the tube or tunnel, having branch wires permanently connected therewith and extending therefrom into the tube or tunnel at intervals, a wire made up of independent sections extending continuously through the tube or tunnel, a sectional insulating coupling between the sections of wire, having the ends of the wire fitted therein, tilting switch mechanisms to which said wire is suspended, and movable devices whereby electric current is transferred from the main conductor to each of these sections successively during the passage over the section.

2. In a conduit electric railway, a conduit or tube slotted upon the top, a yoke or frame extending from the car down through the slot into the tube or tunnel having rollers or trolleys journaled thereon, a conductor consisting of short sections insulated from each other but connected so as to extend continuously along the tube or tunnel in such a position that the trolleys engage the wire as they pass, tilting non-conducting casings pivoted transversely to the line of the tube or tunnel having upon their outer ends metallic arms by which the sections of wire within the tube are supported so that as the trolleys pass beneath these arms, the casings are tilted to change their normal angle within the tunnel, electro-magnets and armatures within the tilting casings, and a main conductor having branches leading to the electro-magnets.

3. The tilting non-conducting casing, the main conducting wire, extending parallel with the line of track, the electro magnet fixed within the non-conducting casing and having connection between it and the main conducting wire, armatures consisting of rollers R movable in a chamber so as to form contact with the electro magnet when the chamber has been tilted, and a plate upon which said armature is moved which is in communication with the hanger and the wire within the tunnel.

4. In a conduit electric railway, the tube or tunnel having the conductor extending throughout its length, said conductor being made in independent insulated sections having tilting supports connected with each section, branch wires connecting said tilting supports with the main conducting wires which extend parallel with the line of track, an electro magnet and movable armatures through which connection is made between the main wire and the conductor within the tube whenever the hangers are tilted about their fulcrum points, yokes or arms connected with the car, extending into the tube or tunnel through the slot in its upper part, bell crank levers pivoted to the lower ends of the yokes having grooved trolley wheels fixed upon the ends of two of their arms so as to travel in contact with the conductor in the tube or tunnel, the opposite ends of said lever arms having a spring between them, whereby they are allowed to adjust themselves about their fulcrum points to maintain contact with the wire.

In witness whereof I have hereunto set my hand.

ALFRED ROSENHOLZ.

Witnesses:
  GEO. H. STRONG,
  S. H. NOURSE.